United States Patent
Aravamudhan et al.

(10) Patent No.: US 6,563,919 B1
(45) Date of Patent: May 13, 2003

(54) SYSTEM AND METHOD FOR UNIFYING THE IMPLEMENTATION AND PROCESSING OF MOBILE COMMUNICATIONS AND A UNIFIED MOBILITY MANAGER FOR PROVIDING SUCH COMMUNICATIONS

(75) Inventors: Lakshminarasimhan Aravamudhan, Plano, TX (US); John P. Larkins, Plano, TX (US); Rohit Gupta, Plano, TX (US); Haitao Li, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/465,177

(22) Filed: Dec. 17, 1999

(51) Int. Cl.⁷ ................................. H04M 7/00
(52) U.S. Cl. .............. 379/230; 379/229; 455/426; 455/435; 370/401; 370/466
(58) Field of Search ................ 455/426, 435, 455/433, 460; 379/229, 230; 370/338, 328, 352, 401, 466

(56) References Cited

U.S. PATENT DOCUMENTS

| | | | | |
|---|---|---|---|---|
| 5,852,660 A | * | 12/1998 | Lindquist et al. | 379/230 |
| 5,966,431 A | * | 10/1999 | Rieman et al. | 379/115 |
| 6,393,112 B1 | * | 5/2002 | Gottlieb et al. | 379/112.01 |
| 6,418,306 B1 | * | 7/2002 | McConnell | 455/413 |

FOREIGN PATENT DOCUMENTS

| | | |
|---|---|---|
| DE | 198 01 563 A1 | 7/1999 |
| WO | WO 98/20647 | 5/1998 |

OTHER PUBLICATIONS

*Universal Protocol Conversion*, IBM Technical Disclosure Bulletin, Dec. 1995, vol. 38, No. 12.

* cited by examiner

Primary Examiner—Nay Maung
Assistant Examiner—Tanmay Lele
(74) Attorney, Agent, or Firm—Paul W. Fulbright; John D. Crane; Bracewell & Patterson, L.L.P.

(57) ABSTRACT

A gateway cluster has a number of gateways for different types of communication protocols. The respective gateways convert network messages to normalized messages by querying the categories, data, and network types of the normalized data for the mobile systems from which the network messages were generated. A database system stores normalized data in categories. The normalized data include data relating to the mobile systems and network types for the data. A unified mobility manager is coupled to and in communications with the gateway cluster and the database system. The unified mobility manager receives and processes the normalized messages, performs operations based on the normalized messages and on the categories, the data, and the network types of the normalized data, and formulates normalized responses responsive to the normalized messages. The normalized responses are converted to network responses at the gateways, and the network responses are sent to the respective mobile systems.

22 Claims, 7 Drawing Sheets

*Fig. 7*

- 102 — Permanent Transient Subscriber Data
- 104 — Top level User Identity (Person, UserNAI, etc.)
- 106 — User Identity/Terminal Identity
  - NAI, IMSI, MIN, and IP Addresses
- 108 — Equipment Identity
  - Serial Number (GSM and NAC), PC Identity (MAC Address?), Intel Chip ID
- 110 — Personal Information - name, address, etc.
- 112 — Service Level Agreements (SLA)
- 114 — Terminal capabilities/network capabilities
  - Access specific or technology specific (IP enabled or access enabled)
- 116 — Location Information (macro location)
  - COA (IP address of subnet)
  - MSC ID (NAC only)
  - MSC Number, VLR, and SGSN Number (GSM)
  - LSF NAI (IPM specific)
- 118 — Authentication Information
  - AAV, AuthCap, Akey, and SME (NAC)
  - Authentication Certificates, IPSec, IKE, AAV, Encryption key,etc. (IP networks)
  - SPI
  - Authentication triplets, RAND/SRES, Kc (GSM network)
- 120 — Authorization
  - Authorization Period, Geographic Authorization (NAC)
  - RSZI lists, call barring restrictions based on location/roaming, subscription restriction, etc.
  - IP enabled networks - firewall, Lifetime, subnets enabled
- 122 — Surveillance and Call Trace
  - GSM, NAC, IP...
- 124 — Services
  - Quality of Service Profile (GPRS, MIP, 1xRTT MIP)
  - Origination services
    - Local, national, toll, etc.
  - Termination services
    - Forwarding services, conferencing, data delivery, call/data screening
  - Roaming services
    - Location based services and restrictions, etc.

126 — Temporary Transient Subscriber Data

128 — Micro level mobility information of mobile/terminal

130 — Temporary transient information (Needs to be updated frequently where UDS may not be used)
- Location Area ID, control channel data, mobile not reachable flag (NAC).
- MS purged for GPRS, SGSN area restricted flag, etc. for GSM
- MIP/1xrTT - Co-located address flag, broadcast datagrams, identification

*Fig. 8*

SYSTEM AND METHOD FOR UNIFYING THE IMPLEMENTATION AND PROCESSING OF MOBILE COMMUNICATIONS AND A UNIFIED MOBILITY MANAGER FOR PROVIDING SUCH COMMUNICATIONS

BACKGROUND OF THE INVENTION

1. Technical Field

The present invention relates in general to a system and method for unifying the implementation and processing of mobile communications by various mobile devices and units and terminals that operate on various mobile communication protocols and in particular to a unified mobility manager system and method that is used to provide such unified implementation and processing of mobile communications by various mobile devices and units that operate on various mobile communication protocols. Still more particularly, the present invention relates to normalizing messages from the various mobile devices and units and terminals, to processing, handling, and responding to these normalized messages, and to converting the normalized responses back to respective communication protocols.

2. Description of the Related Art

For the present description, the term "mobile" or "mobility" is used to define and describe a device, unit, terminal, or system that is able to be moved from one location to another location, whether the device, unit, terminal, or system is a wireless system that is movable or a wireline system that is movable. Furthermore, for this present description, the phrase "mobile communication" or "mobility communication" is used to define and describe communication protocols that track movement of such "mobile" devices, units, terminals, or systems from one location to another location and that provide and support communications for such "mobile" devices, units, terminals, or systems (i.e. whether these devices, units, terminals, or systems are wireless systems that are movable or wireline systems that are movable). As will be seen later in the specification, the present invention is not in any way limited to any particular communication device, unit, terminal, system, or respective communication protocol, and the present invention may be utilized with any device, unit, terminal, or system that is able to be moved from one location to another location (whether a wireless system or a wireline system) and with any communication protocol that tracks, provides, and supports communications for such devices, units, terminals, or systems from one location to another location.

In the telecommunications field, various access technologies and communication protocols exist. Examples of such access technologies and communication protocols are ANSI41 (North American Cellular), Group Special Mobile (GSM) network, cable modem network, mobile Internet protocol (IP), Public Switched Telephone Network (PSTN), data network, IS-136 Time Division Multiple Access (TDMA), IS-54B Time Division Multiple Access (TDMA), Advanced Mobile Phone System (AMPS), Code Division Multiple Access (CDMA), and any other such technologies that provide voice and data applications to a mobile customer.

With reference now to the figures and in particular with reference to prior art FIG. 1, FIG. 1 illustrates that each of a number of conventional communication systems employing differing technologies and protocols requires its own serving system 10 for a mobile unit or device or terminal 14 to locate and find its own home system 12 in order to enable further communication based services to be provided to the mobile unit or device or terminal 14 (i.e. voice related applications, data related applications, or any other form of information exchange). A home system 12 is typically where the subscriber or user information resides, and a serving system 10 is any system that provides services to and that registers or attempts registration of a mobile unit or device or terminal 14 that is outside of its home system 12 by finding and forwarding a request(s) to the home system 12. FIG. 1 shows that the mobile system 14 is away from its home system 12 and is at a location in which it sends its request to the serving system 10. The serving system 10 then tracks, finds, and forwards the request to the home system 12 of the mobile system 14. The home system 12 has a home message processor 15 that processes the request. A response to the request is sent from the home message processor 15 to the mobile system 14 through the serving system 10.

FIG. 1 shows that each different type of mobile communication protocol involves a mobile unit or device or terminal type that requires and accesses its respective type of serving system and home system. For example, ANSI41 or North American Cellular (NAC) is the communication protocol for cellular communications in North America. FIG. 1 shows that if an ANSI41 mobile unit or device 14A (i.e. cellular telephone or device) is away from its home area (i.e. home system 12A), then the ANSI41 mobile unit or device 14A must communicate with a local and compatible ANSI41 serving system 10A. The local and compatible ANSI41 serving system 10A, in turn, finds and locates the home system 12A for that mobile unit or device 14A, which is an ANSI41 type, for the mobile unit or device 14A, and the serving system 10A sends a request(s) on behalf of the ANSI41 mobile unit or device 14A to its home system 12A. The home system 12A has an ANSI41 message processor or HLR 15A that is able to handle and process the ANSI41 request and sends back a corresponding response to the request.

FIG. 1 shows similar topologies for the GSM protocol, cable protocol, and Internet protocol (IP). For example, a GSM mobile unit or device 14B requires and is enabled with communications only through a GSM serving system 10B and a GSM home system 12B having a GSM message processor 15B that handles and processes GSM requests or messages. A cable modem mobile unit or device 14C similarly requires and is enabled with communications only through a cable modem serving system 10C and a cable modem home system 12C having a cable modem message processor 15C that handles and processes cable modem requests or messages, and an IP mobile unit or device 14D requires and is enabled with communications only through an IP serving system 10D and an IP home system 12D having an IP message processor 15D that handles and processes IP requests or messages.

Thus, each individual type of communication protocol, such as the ones discussed above, requires its own type of message processor at the home system and its own separate hardware system for implementation. Furthermore, as shown in FIG. 1, the communications provided and enabled by the home systems 12, 12A, 12B, 12C, and 12D are tracked to respective mobile systems 14, 14A, 14B, 14C, and 14D. However, a person who possesses mobile devices or units of different communication protocol types generally has subscriptions to the services for those types of communication, and these subscriptions and services require separate provisions of the services and usually separate management and billing. Presently, cross-over for processing and handling the various messages and responses for the different communication protocols generally does not exist at this time. A system and method of unifying management of the various mobile communication protocols and of tracking a person with subscriptions to services of various mobile communication protocols do not exist. Furthermore, the unification of subscriptions of various communication services across various respective communication protocols under a single umbrella for each subscriber, user, or customer also does not exist at this time.

For example, if a person owns a cellular telephone and a mobile laptop computer with Internet access, then another person trying to reach that person has to separately dial the cellular telephone and separately send an e-mail message to communicate through the mobile laptop computer. A system and method of tracking the mobility communications of a person and allowing a unified manager to automatically try the various mobile communication protocols for which the person has subscription(s) does not exist. For example, such a method that does not exist involves a type of unified communication manager for tracking the communications mobility of the person by first trying to access the person's cellular telephone and then automatically sending the e-mail message to the person's mobile laptop computer if the person was not reached by cellular telephone.

Thus, each type of mobile communication protocol requires its own separate hardware system, management, and provision of service. Present tracking of mobile communications is generally to a mobile device or unit and is not linked in any way to a person. A person may own various mobile communication devices or units. In the present technology, the communications of all of the mobile systems are each maintained and managed separately and are not unified in any manner. A unified management of mobile communications would allow the tracking of mobile communications to a person. The concept of unification of communication mobility management irrespective of the various access technologies and protocols at the home system presently does not exist. Furthermore, the unification of subscriptions of various communication services across various respective communication protocols under a single umbrella for each subscriber, user, or customer also does not exist.

It would therefore be advantageous and desirable to provide a system and method for unifying the implementation and processing of mobile communications by various mobile devices and units and terminals that operate on various mobile communication protocols. It would also be advantageous and desirable to provide a unified mobility manager system and method that is used to provide such unified implementation and processing of mobile communications by various mobile devices and units and terminals that operate on various mobile communication protocols. It would still be advantageous and desirable to normalize messages from the various mobile devices and units and terminals, to process, handle, and respond to these normalized messages, and to convert the normalized responses back to respective communication protocols. It would also be advantageous and desirable to provide a unified hardware system for various types of mobile communication protocols. It would also be advantageous and desirable to provide a system and method that allow tracking of mobile communications to a person and to his/her subscription services for various mobile communication types. It would further be advantageous and desirable to unify maintenance and management of the mobile communications that are of various mobile communication protocol types. It would still further be advantageous and desirable to provide unification of mobility management irrespective of the various access technologies and protocols that exist at the home system. It would still also be advantageous and desirable to unify subscriptions of various communication services across various respective communication protocols under a single umbrella for each subscriber, user, or customer.

SUMMARY OF THE INVENTION

It is therefore one object of the present invention to provide a system and method for unifying the implementation and processing of mobile communications by various mobile devices and units and terminals that operate on various mobile communication protocols.

It is also another object of the present invention to provide a unified mobility manager system and method that is used to provide such unified implementation and processing of mobile communications by various mobile devices and units and terminals that operate on various mobile communication protocols.

It is still a further object of the present invention to normalize messages from the various mobile devices and units and terminals, to process, handle, and respond to these normalized messages, and to convert the normalized responses back to respective communication protocols.

It is a further object of the present invention to provide a unified hardware system for various types of mobile communication protocols.

It is still another object of the present invention to provide a system and method that allow tracking of mobile communications to a person and to his/her subscription services for various mobile communication types.

It is still a further object to unify maintenance and management of the mobile communications that are of various mobile communication protocol types.

It is still another object of the present invention to provide unification of mobility management irrespective of the various access technologies and protocols that exist at the home system.

It is still also an object of the present invention to unify subscriptions of various communication services across various respective communication protocols under a single umbrella for each subscriber, user, or customer.

The foregoing objects are achieved as is now described. A system and method for unifying and handling network messages of various communication protocols from various mobile systems. The network messages are being handled at a home system for the various mobile systems. A gateway cluster has a number of gateways of different types of communication protocols. The gateway cluster receives the network messages of the respective communication protocols at the home system. The respective gateways convert the network messages to normalized messages by querying the categories, the data, and the network types of the normalized data for the mobile systems from which the network messages were respectively generated therefrom. A database system stores normalized data in categories. The normalized data at least includes data relating to the mobile systems and network types for the data. A unified mobility manager is coupled to and in communications with the gateway cluster and the database system. The unified mobility manager receives and processes the normalized messages, performs operations based on the normalized messages and on the categories, the data, and the network types of the normalized data, and formulates normalized responses responsive to the normalized messages. The normalized responses are converted to network responses at the gateways and the network responses are sent to the respective mobile systems. A normalized data structure is provided for the normalized data, and the data structure generally comprises network message data, a category type for the data, and a network type that is reflective of the communication protocol from the network message.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a chart of permanent and transient subscriber data used in the present invention; and FIG. 8 is a chart of temporary transient subscriber data used in the present invention.

DETAILED DESCRIPTION OF ILLUSTRATIVE EMBODIMENT

For the present detailed description, the term "mobile" or "mobility" is used to define and describe a device, unit, terminal, or system that is able to be moved from one location to another location, whether the device, unit, terminal, or system is a wireless system that is movable or a wireline system that is movable. Furthermore, for this present detailed description, the phrase "mobile communication" or "mobility communication" is used to define and describe communication protocols that track movement of such "mobile" devices, units, terminals, or systems from one location to another location and that provide and support communications for such "mobile" devices, units, terminals, or systems (i.e. whether these devices, units, terminals, or systems are wireless systems that are movable or wireline systems that are movable). The present invention described herein is not in any way limited to any particular communication device, unit, terminal, system, or respective communication protocol, and the present invention may be utilized with any device, unit, terminal, or system that is able to be moved from one location to another location (whether a wireless system or a wireline system) and with any communication protocol that tracks, provides, and supports communications for such devices, units, terminals, or systems that are movable from one location to another location.

Figure 2:
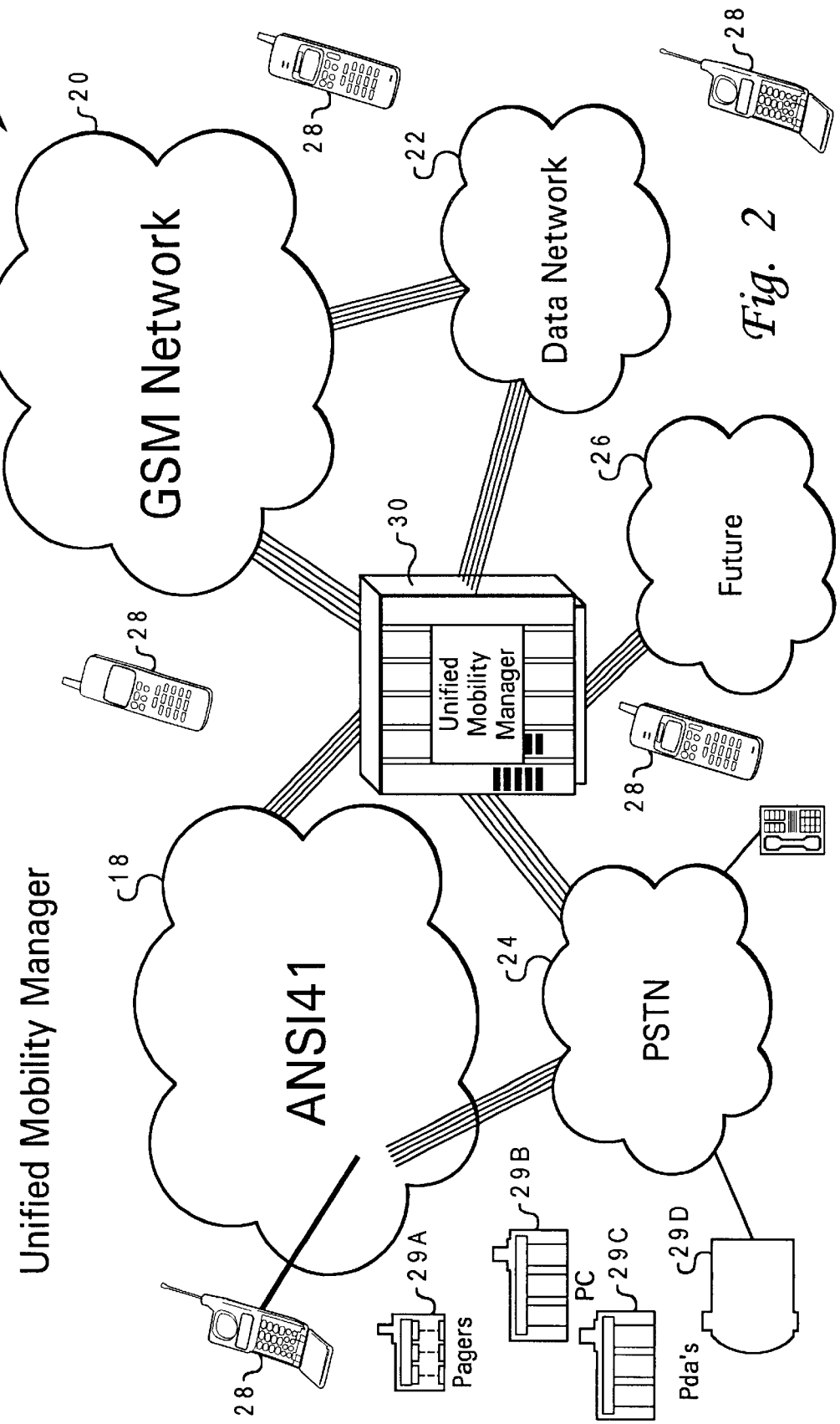
FIG. 2 is a block diagram showing an example topology of the present invention unified mobility manager (UMM) used to provide unified implementation and processing of mobile communications by various mobile systems that operate on various mobile communication protocols.

The present invention is a system and method for unifying the implementation and processing of mobile communications by various mobile devices and units and terminals ("mobile systems") that operate on various mobile communication protocols. With reference now to the figures and in particular with reference to FIG. 2, a unified mobility manager (UMM) 30 is shown. The UMM 30 unifies implementation and processing of mobile communications by various mobile systems, such as cellular/mobile telephones 28, pagers 29A, personal computers (PCs) 29B, Personal Digital Assistants (PDAs) 29C, etc., that operate on different mobile communication protocols, such as North American Cellular (NAC) or ANSI41 18, Group Special Mobile (GSM) network 20, a data network 22, a Public Switched Telephone Network (PSTN), etc. The UMM 30 is also adapted to support any other future network or protocol 26 as shown in FIG. 2. FIG. 2 shows that the UMM 30 provides a unified hardware system 30 that implements and processes messages and provides responses for various types of mobile communication protocols. The UMM 30 and the system and method of the present invention allow tracking of mobile communications to a person and to his/her subscription services for various mobile communication types. Thus, maintenance and management of the mobile communications that are of various mobile communication protocol types are unified.

As shown in FIG. 2, the UMM 30 provides a mobility manager platform that is capable of receiving messages for different networks (such as NAC/ANSI41 18, Group Special Mobile (GSM) network, cable modem network, mobile Internet protocol (IP), Public Switched Telephone Network (PSTN), data network, IS-136 Time Division Multiple Access (TDMA), IS-54B Time Division Multiple Access (TDMA), Advanced Mobile Phone System (AMPS), Code Division Multiple Access (CDMA), and any other such present or future technologies that is able to track, provide, and support mobile communications of mobile devices, units, terminals, or systems that move from one location to another location and that provide voice and data applications or any other information exchange to a mobile customer or user). The UMM 30 provides a unified mechanism of dealing with mobility communications for users/customers. The UMM 30 provides a logical common point for all mobility related messages regardless of the access mechanism at the home system. The reuse of technology is maximized by providing an Unified Directory Services (UDS) system 31 (see FIG. 5). The UMM 30 and UDS 31 will be discussed in more detail later. The UMM 30 and UDS 31 allow the creation of a common addressing mechanism, low level message parsing, state machine, etc. The present invention is able to provide and use context specific handlers as needed to support a specific protocol. The UMM 30 receives control messages that arrive in various networks and provide mobility management operations such as addressing, location, tracking of the user and his/her device(s), routing, etc. The UMM 30 minimizes the need for separate hardware and software platforms and creates a unified, consistent mechanism for services provided to the users for mobile systems of different types of communication protocols. The UMM 30 provides unification of mobility management irrespective of the various access technologies and protocols that exist at the home system.

FIG. 2 shows that the UMM 30 involves profile integration and provides a common point for all mobility related messages regardless of access technology or protocol. The profile integration is the combining of various communication protocols into a common representation or normalized data. The profile integration is accomplished by looking for common mobility management attributes in various protocols and creating an independent normalized protocol representation. The common point for all mobility related messages is provided by the UMM 30. The UMM 30 is able to handle the mobility related messages in two general ways: 1) It can receive and handle all control messages in their respective communication protocol formats (i.e. ANSI41, Mobile Application Part (MAP), Mobile Internet Protocol (MIP), Next Generation (NG), Authentication Authorization and Accounting (AAA), nomadic wired mobility, or any other such present or future technologies that is able to track, provide, and support mobile communications of mobile devices, units, terminals, or systems that move from one location to another location and that provide voice and data applications or any other information exchange to a mobile customer or user) and 2) It can convert and handle all control messages in their respective communication formats (i.e. ANSI41, Mobile Application Part (MAP), Mobile Internet Protocol (MIP), Next Generation (NG), Authentication Authorization and Accounting (AAA), nomadic wired mobility, or any other such present or future technologies that is able to track, provide, and support mobile communications of mobile devices, units, terminals, or systems that move from one location to another location and that provide voice and data applications or any other information exchange to a mobile customer or user) into a normalized protocol that encompasses all mobility related functions and operations. These two options result in two respective conversions: 1) Protocol conversions, where only essential elements required for basic mobility management of legacy functions are converted and 2) Mobility management conversion, where only essential components of legacy mobility management functions are ported to the new UMM 30.

The present invention requires the unification of the information that the UMM 30 needs to access to be in a normalized manner or fashion so that the UMM 30 is able to, in fact, access this data. Therefore, a unified data storage method is required and disclosed for the present invention. The information needed by the UMM 30 needs to be analyzed and categorized.

Figures 3, 4:
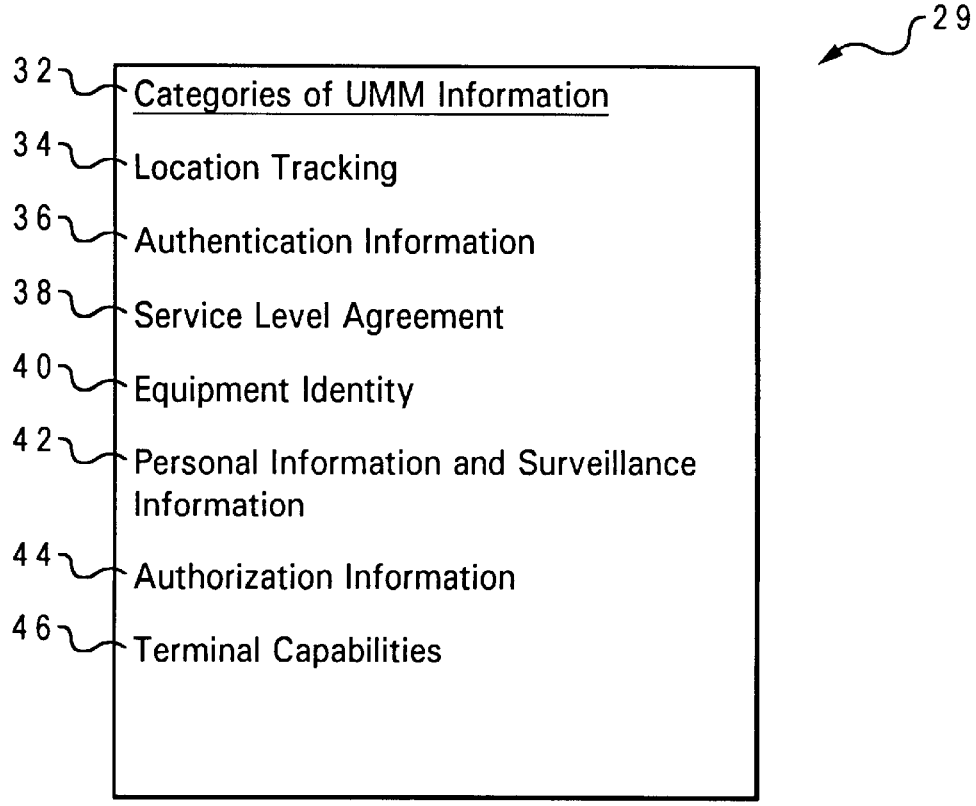
FIG. 3 is a chart of example categories of UMM information.
FIG. 4 is an example data organization chart for the authentication information category showing various normalized data defined for each network/personality type (i.e. each communication protocol)

With reference now to the figures and in particular with reference to FIG. 3, a chart 29 shows some example categories 32 of information needed by the UMM 30. Some common categories 32 of UMM information for various access technologies or communication protocols include but are not limited to location tracking information 34, authentication information 36, service level agreement 38, equipment identity 40, personal information and surveillance information 42, authorization information 44, and terminal capabilities 46. The present invention is not in any way limited to the specific categories disclosed, and any suitable category may be used in conjunction with the present invention.

After these common categories 32 have been established, data 50 pertaining to each category for each network/personality type 48 (to each category within each type of communication protocol) is established, maintained, and constantly updated. With reference now to the figures and in particular with reference to FIG. 4, an example data organization chart 47 for the authentication information category 36 is shown. FIG. 4 shows the chart 47 with various normalized data 50 defined for each network/personality type 48 for the authentication information category 36. The data 50 is normalized data which is readable and usable by the UMM 30. For example, the chart 47 shows that for the network/personality of ANSI41 18 (such as for a cellular telephone), the normalized data 50 for the authentication information 36 is defined as Authentication Algorithm Version (AAV), Authentication Capability (AuthCap), Authentication Key (Akey), and Signaling and Messaging Encryption (SME) (NAC) wherein this normalized data 50 is used by the UMM 30 in order to handle and process authentication information for an ANSI41 network/personality. The chart 47 further shows that for the cable network/personality (such as for cable modem), the normalized data 50 for the authentication information 36 is defined as Cable Modem specific authorization wherein this normalized data 50 is used by the UMM 30 in order to handle and process authentication information for a cable network/personality. The chart 47 also shows that for the network/personality of GSM 20 or GSM GPRS, the normalized data 50 for the authentication information 36 is defined as Authentication (Auth.) triplets, Random Number (RAND/SRES), and Authentication Key (Kc) wherein this normalized data 50 is used by the UMM 30 in order to handle and process authentication information for a GSM or GSM/GPRS network or personality. The chart 47 still further shows that for the mobile IP network/personality (such as for a mobile computer with IP access), the normalized data 50 for authentication information 36 is defined as Authentication Certificates (Auth. Certificates) and encryption key wherein this normalized data 50 is used by the UMM 30 in order to handle and process authentication information for a mobile IP network/personality. Other charts similar to chart 47 would exist for the other categories (i.e. location tracking, service level agreement, equipment identity, personal information and surveillance information, authorization information, terminal capabilities, etc.) for correlating normalized data for each category to respective networks/personalities. The present invention is not in any way limited to the specific data category, network/personality, organization or normalization of data disclosed, and any suitable category, network/personality, data organization or normalization of data is able to be used in conjunction with the present invention. Furthermore, any present or future communication protocol that requires mobility management and that tracks, supports, and provides communications of a mobile device, unit, terminal, or system, whether it is a wireless system or a wireline or wired system, is able to be used in conjunction with the present invention.

Thus, all information pertaining to the various networks/personalities are stored in the same or similar format as illustrated in the example of FIG. 4. The generic representation of the format (as illustrated in chart 47 of FIG. 4) is as follows: network/personality type followed by the data for that network/personality type. The identification and correlation of the network/personality type to the data allows conversion from the network specific messages to normalized data and vice versa as well. Any data that is already common to all networks is unlabelled and is able to be extracted and directly accessed for all network types.

Figure 1:
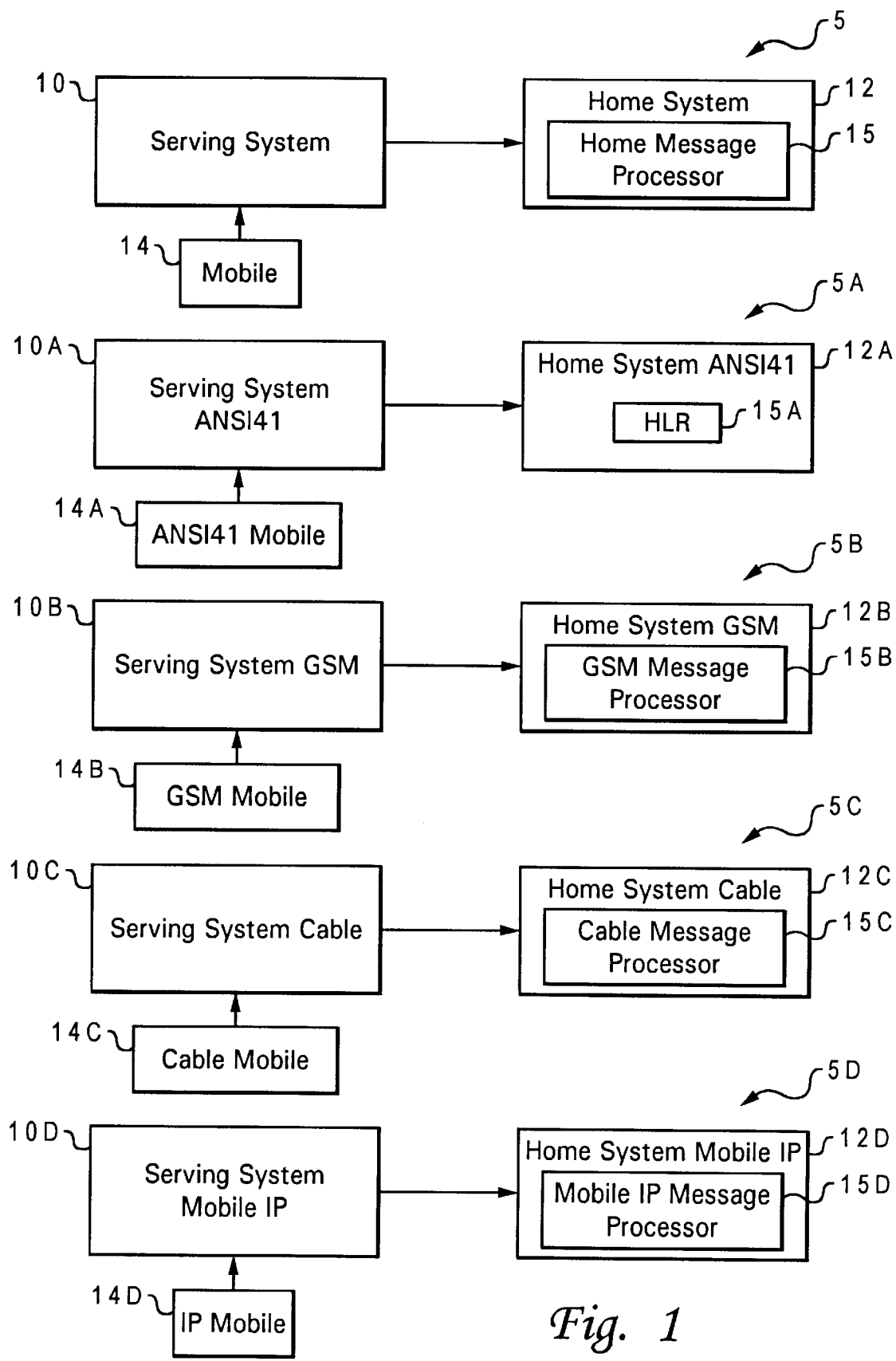
FIG. 1 are prior art block diagrams of various individual and separate configurations of mobile communications wherein each of the diagrams shows an individual and separate hardware system that has a mobile system which uses a local serving system to locate and find its home system in order to enable its respective type of communication protocol and provide communications for the mobile system.
Figure 5:
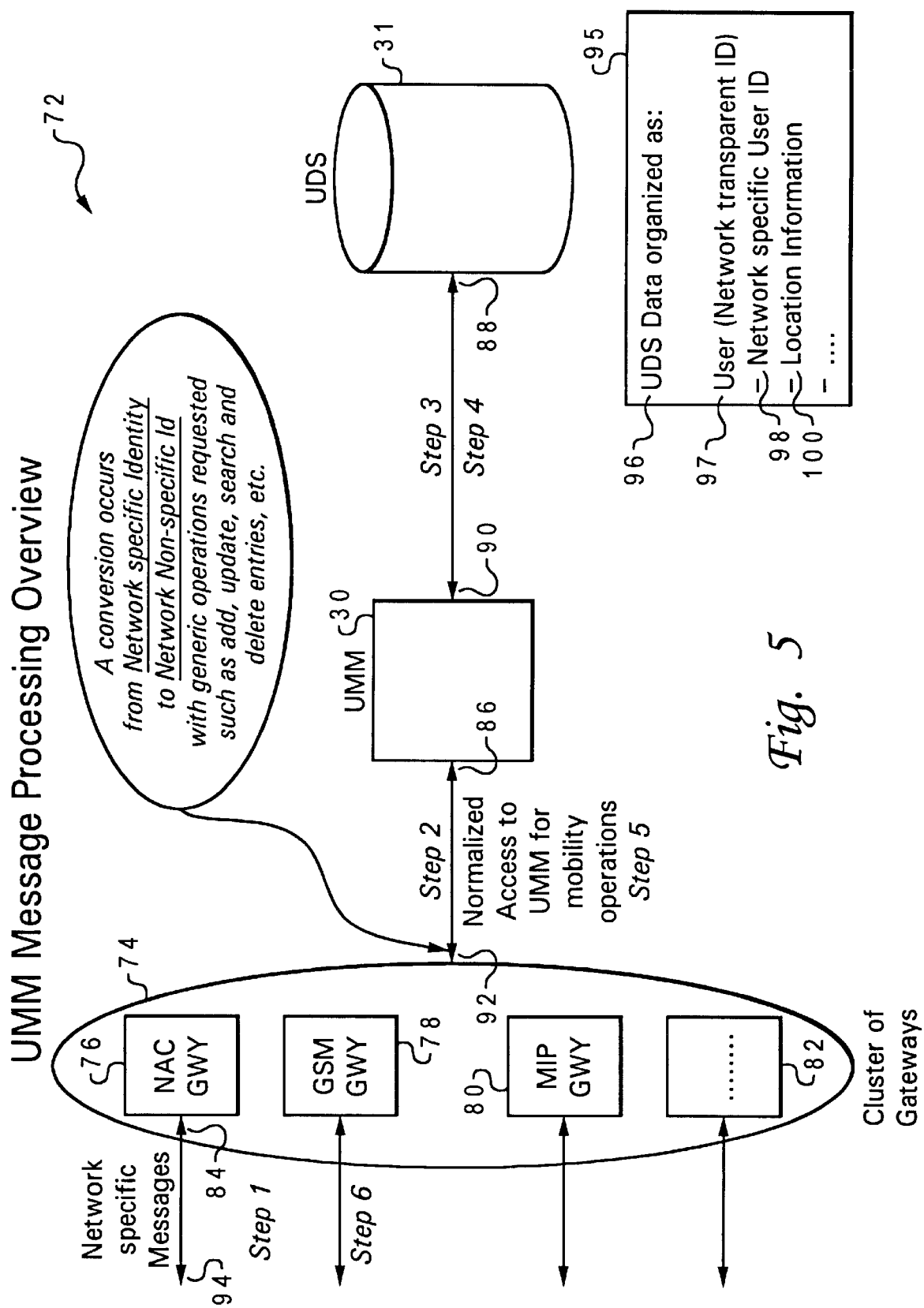
FIG. 5 is a block diagram of a UMM/UDS message processor system that handles and processes UMM messages.

With reference now to the figures and in particular with reference to FIG. 5, the Unified Mobility Manager/Unified Directory Services (UMM/UDS) message processor system 72 that handles and processes UMM messages that were converted from network specific messages is shown. Referring to FIGS. 1 and 5, the UMM/UDS message processor system 72 is located in the home system 12 and replaces the home message processor 15 located therein. Referring to FIG. 5, the UMM/UDS message processor system 72 comprises three main sub-systems: the gateway cluster 74, the Unified Mobility Manager (UMM) 30, and the Unified Directory Services (UDS) 31. The gateway cluster 74 comprises a number of gateways for various communication protocols (i.e. networks/personalities 48). These gateways receive network specific messages from the serving system 10 (i.e. see block diagram 5 of FIG. 1). The UMM 30 manages, retrieves, and performs all operations requested by network specific messages. The UDS 31 allows respective operations to be performed on it by the UMM 30, and the UDS 31 supplies all of the information needed to the UMM 30 by supplying the Network Specific Identifier (NSI), the Network Transparent Identifier (NTI), and the specific network/personality type 48 along with any common information that the user needs.

The present invention involves the implementation of a UMM message processing and handling method, which is illustrated in FIG. 5. The first step of the method, which generally occurs at location 84, involves the network specific messages being received by the gateway cluster 74 and directed to respective types of gateways depending on the type of messages received. For example, if a specific ANSI41 or NAC message is received at the gateway cluster 74, then the message is forwarded, normalized, and processed by the ANSI41 or NAC gateway 76. If a specific GSM message is received at the gateway cluster 74, then the message is forwarded, normalized, and processed by the GSM gateway 78. If a specific Mobile Internet Protocol (MIP) message is received at the gateway cluster 74, then the message is forwarded, normalized, and processed by the MIP gateway 76. This step of processing messages is performed in the same manner for any other types of messages at respective types of gateways. The second step of the method, which occurs at location 86, involves converting the network specific identities of the specific message to a network transparent identifier (NTI). The respective gateway performs the conversion, and the conversion is accomplished by looking up a conversion table of information, such as a local cache or UDS lookup table (i.e. conversion table may be derived from category charts, such as the chart 36 in FIG. 4). The conversion is generally from a Network Specific Identity (NSI) to a Network Non-specific Identity (NNI) with generic operations requested such as add, update, search, delete entries, etc. The normalized message having the NTI is forwarded to the UMM 30. The third step of the method, which generally occurs at location 88, involves the UMM 30 processing the normalized message and then performing the appropriate operation on the UDS 31. The information that is needed from the UDS 31 is obtained by supplying the Network Specific Identifier (NSI) along with the Network Transparent Identifier (NTI) and the specific network/personality type 48.

The fourth step of the UMM message processing method, which generally occurs at location 90, involves the UMM 30 retrieving and performing all the operation(s) requested by the network specific message that was/were from the mobile system 14 of the user. The UDS 31 searches through the unified or normalized data to look for any information pertaining to the user using the NSI and network/personality type 48 along with any common information that the mobile system 14 of the user needs. An example of how the UDS data 96 is organized in the UDS 31 is shown in chart 95. The UDS data 96 may include the identification of the user 97. For that user 97, the network specific user identification (ID) 98, the location information 100, and other such information may be identified. The fifth step of the method, which generally occurs at location 92, involves the UMM 30 sending an intended response in the normalized manner to the appropriate and respective gateway within the gateway cluster 74. The respective gateway then converts the normalized response back to the corresponding communication protocol (i.e. network/personality), which provides a network specific response. The sixth step of the method, which generally occurs at location 94, involves sending the converted network specific response back through the serving system 10 and to the mobile system 14 and user (i.e. see block diagram 5 of FIG. 1).

Figure 6:
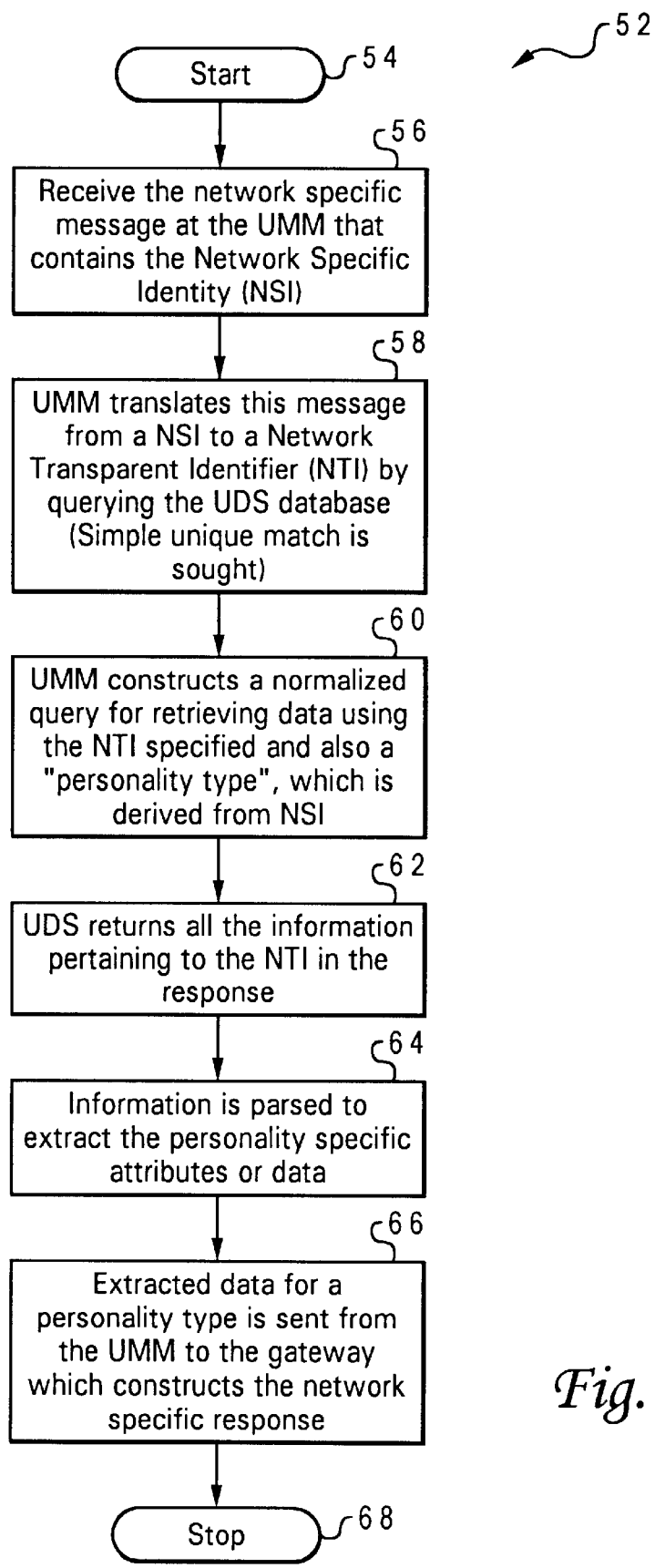
FIG. 6 is a flow chart of an algorithm for the handling and processing of UMM messages by the UMM/UDS message processor system and through a gateway cluster.

With reference now to the figures and in particular with reference to FIG. 6, a flow chart of an algorithm 52 for handling and processing of UMM messages by the UMM/UDS message processor system 72 and through a gateway cluster 74 and for accessing the normalized data in the UDS 31 is shown. The algorithm 52 starts at block 54. The algorithm 52 moves to block 56 where a network specific message (i.e. from the serving system 10 as shown in FIG. 1) is received at the UMM 30. The network specific message contains a network specific identity (NSI). The algorithm 52 moves to block 58 where the UMM 30 translates this message from a NSI to a network transparent identifier (NTI) by querying the UDS 31. At this step at block 58, a simple unique match is generally sought. The algorithm 52 moves to block 60. At block 60, the UMM 30 constructs a normalized query for retrieving data using the NTI specified and a network/personality type 48, which is derived from the NSI of the network specific message. The algorithm 52 moves to block 62 where the UDS 31 returns all of the information pertaining to the NTI in response to the network specific message. The algorithm 52 moves to block 64 where the information is parsed to extract the network/personality specific attributes or data. The algorithm 52 moves to block 66 where the extracted data which constructs the network specific response for a network/personality type 48 is sent from the UMM 31 to the gateway cluster 74 and to the appropriate and respective gateway. The algorithm 52 ends and stops at block 68.

The present invention provides unification of subscriptions of various communication services across various respective communication protocols under a single umbrella for each subscriber, user, or customer. A user may have mobile devices, units, or terminals in which respective subscriptions to services for these devices, units, or terminals have been obtained, and the mobile devices or units or terminals are of different types of communication protocols. The present invention, which includes the gateway cluster 74, the UMM 30, and the UDS 31 at the home system 12 that processes network specific messages, may be implemented and used to track the various mobile communications of a user instead of the mobile systems or mobile devices, units, or terminals themselves. The normalized data provides a way for tracking all of the mobile communication protocols and mobile systems utilized by the user since all of the data is able to be stored in an unified manner (i.e. in a unified storage system and handled by a unified data manager), that is, respectively UDS 31 and UMM 30. All of the information for a user and his/her mobile systems able to be stored as normalized data in the UDS 31.

With reference now to the figures and in particular with reference to FIG. 7, a chart of permanent and transient subscriber data 102, which is an example of normalized data for the present invention, is shown. FIG. 7 shows an example organization and format for the different types of permanent and transient data 102. The permanent and transient subscriber data 102 includes but is not limited to the following: 1) Top level User Identity 104 (i.e. Person, UserNAI, etc.); 2) User Identity/Terminal Identity 106 (i.e. NAI, IMSI, MI, and IP addresses); 3) Equipment Identity 108 (i.e. Serial Number (GSM and NAC), PC Identity (MAC Address), Intel Chip ID); 4) Personal Information 110 (i.e. name, address, etc.); 5) Service Level Agreements (SLA) 112; 6) Terminal capabilities/network capabilities 114 (i.e. Access specific or technology specific (IP enabled or access enabled)); 7) Location Information 116 (macro location) (i.e. COA (IP address of subnet), MSC ID (NAC only), MSC Number, VLR, SGSN Number (GSM), LSF NAI (IPM specific)); 8) Authentication Information 118 (i.e. AAV, AuthCap Akey, SME (NAC), Authentication Certificates, IPSec, IKE, AAV, Encryption key, etc. (IP networks),. Security Parameter Index (SPI), Authentication triplets, RAND/SRES, and Kc (GSM network)); 9) Authorization 120 (i.e. Authorization Period, Geographic Authorization (NAC), RSZI lists, Call barring restrictions based on location/roaming, subscription restriction, etc., IP enabled networks (such as firewall, lifetime, subnets enabled)); 10) Surveillance and Call Trace 122 (i.e. GSM, NAC, IP, etc.); 11) Services 124 (i.e. Quality of Service Profile (such as GPRS, MIP, 1xRTT MIP), Origination services (such as local, national, toll, etc.), Termination services (such as forwarding services, conferencing, data delivery, call/data screening), Roaming services (such as location based services and restrictions, etc.).

With reference now to the figures and in particular with reference to FIG. 8, a chart of temporary transient subscriber data, which is another example of normalized data, is shown. FIG. 8 shows an example organization and format for the different types of temporary transient data 126. The temporary subscriber data 126 includes but is not limited to the following: 1) Micro level mobility information of the mobile/terminal 128; 2) Temporary transient information 130, which needs to be updated frequently where the UDS 31 may not be used (i.e. Location Area ID, Control channel data, mobile not reachable flag (NAC), MS Purged for GPRS, SGSN area restricted flag, etc. for GSM, MIP/1xrTT such as co-located address flag, broadcast data grams, identification).

While the invention has been particularly shown and described with reference to a preferred embodiment, it will be understood by those skilled in the art that various changes in form and detail may be made therein without departing from the spirit and scope of the invention.

What is claimed is:

1. A method of unifying and handling network messages of various communication protocols from various mobile systems wherein the network messages are being handled at a home system for the various mobile systems comprising the steps of:

storing normalized data which at least includes data relating to the mobile systems and network types of the mobile systems correlated to the data wherein the normalized data are stored in categories in a database system, receiving the network messages at the home system, converting the network messages to normalized messages by querying the categories, the data, and the network types of the normalized data for the mobile systems from which the network messages were respectively generated therefrom, processing the normalized messages and performing operations based on the normalized messages and based on the categories, the data, and the network types of the normalized data, formulating normalized responses responsive to the normalized messages, converting the normalized responses to network responses, and sending the network responses to the respective mobile systems.

2. The method according to claim 1, wherein the step of storing normalized data further comprises the step of:

storing the normalized data in a unified directory services system.

3. The method according to claim 1, wherein the step of receiving the network messages further comprises the steps of:

receiving the network messages at a gateway cluster that has a number of gateways for different types of communication protocols, determining the different types of communication protocols for the network messages, and directing each of the network messages to a respective one of the gateways based on each of the determined different types of communication protocols for the each of the network messages.

4. The method according to claim 3, wherein the converting steps are performed at the gateways.

5. The method according to claim 1, wherein the network messages contain network specific identities and wherein the step of converting the network messages further comprises the step of:

converting the network specific identities of the network messages to network transparent identifiers.

6. The method according to claim 5, wherein the step of converting the network specific identities further comprises the steps of:

providing lookup tables in the database system for the categories, and using the lookup tables to convert the network specific identities to the network transparent identifiers.

7. The method according to claim 1, wherein the step of processing the normalized messages further comprises the steps of:

forwarding the normalized messages to a unified mobility manager, and using the unified mobility manager to perform appropriate operations on the database system.

8. The method according to claim 7, wherein the network messages contain network specific identities and wherein the step of converting the network messages further comprises the step of converting the network specific identities of the network messages to network transparent identifiers and wherein the step of using the unified mobility manager further comprises the step of:

obtaining information needed for performing the appropriate operations by supplying the network specific identities along with the network transparent identifiers and the network types to the database system.

9. The method according to claim 1, wherein the step of processing the normalized messages further comprises the steps of:

using a unified mobility manager for retrieving and performing the appropriate operations, and having the database system search through the normalized data to look for information relating to the mobile systems.

10. The method according to claim 9, wherein the network messages contain network specific identities and wherein the step of converting the network messages further comprises the step of converting the network specific identities of the network messages to network transparent identifiers and wherein the step of having the database system search further comprises the step of:

using the network specific identities, the network types, and common information for finding the information relating to the mobile systems.

11. A system for unifying and handling network messages of various communication protocols from various mobile systems wherein the network messages are being handled at a home system for the various mobile systems comprising:

a gateway cluster having a number of gateways of different types of communication protocols for receiving the network messages of the respective communication protocols at the home system and for converting the network messages to normalized messages at the gateways by querying the categories, the data, and the network types of the normalized data for the mobile systems from which the network messages were respectively generated therefrom, a database system for storing normalized data in categories wherein the normalized data at least includes data relating to the mobile systems and network types of the mobile systems correlated to the data, a unified mobility manager coupled to and in communications with the gateway cluster and the database system wherein the unified mobility manager receives and processes the normalized messages, performs operations based on the normalized messages and based on the categories, the data, and the network types of the normalized data, and formulates normalized responses responsive to the normalized messages, and wherein the normalized responses are converted to network responses at the gateways and the network responses are sent to the respective mobile systems.

12. The system according to claim 11, wherein the database system is a unified directory services system.

13. The system according to claim 11, wherein the respective gateways determine the different types of communication protocols for the network messages and direct each of the network messages to a respective one of the gateways based on each of the determined different types of communication protocols for the each of the network messages.

14. The system according to claim 11, wherein the network messages contain network specific identities and the gateways convert the network specific identities of the network messages to network transparent identifiers.

15. The system according to claim 14, wherein the database system comprises lookup tables for the categories wherein the lookup tables are used by the gateways to convert the network specific identities to the network transparent identifiers.

16. The system according to claim 11, wherein the unified mobility manager performs appropriate operations on the database system.

17. The system according to claim 16, wherein the network messages contain network specific identities and wherein the gateways convert the network specific identities of the network messages to network transparent identifiers and wherein the unified mobility manager obtains information needed for performing the appropriate operations by supplying the network specific identities along with the network transparent identifiers and the network types to the database system.

18. The system according to claim 11, wherein the unified mobility manager is used for retrieving and performing the appropriate operations and the database system searches through the normalized data to look for information relating to the mobile systems.

19. The system according to claim 18, wherein the network messages contain network specific identities and wherein the gateways convert the network specific identities of the network messages to network transparent identifiers and wherein the database system uses the network specific identities, the network types, and common information for finding the information relating to the mobile systems.

20. A normalized data structure used for unifying and handling one of a number of network messages based on one of a number of communication protocols from various mobile systems wherein the network messages are being handled at a home system for the various mobile systems, said normalized data structure comprising:

data storage including:
data from the one of the network messages,
one of a number of data categories for identifying a category type of the data, said data categories including location tracking information, service level agreement, personal information and terminal capabilities, and
one of a number of network types that identifies and correlates the respective one of the communication protocols to the data.

21. The normalized data structure according to claim 20, wherein the data categories further include authentication information, equipment identity, surveillance information, and authorization information.

22. The normalized data structure according to claim 20, wherein the network types include at least two network types among: a NAC/ANSI41 network, a Group Special Mobile (GSM) network, a cable modem network, a mobile Internet protocol (IP), a public switched telephone network (PSTN), a data network, an IS-136 time division multiple access (TDMA), an IS-54B time division multiple access (TDMA), an advanced mobile phone system (AMPS), and a code division multiple access (CDMA).

* * * * *